(12) United States Patent
Nagayama et al.

(10) Patent No.: US 6,924,858 B2
(45) Date of Patent: Aug. 2, 2005

(54) LIQUID CRYSTAL DISPLAY UNIT

(75) Inventors: Kohei Nagayama, Fukaya (JP); Yasuyuki Hanazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/188,053

(22) Filed: Jul. 3, 2002

(65) Prior Publication Data

US 2003/0007115 A1 Jan. 9, 2003

(30) Foreign Application Priority Data

Jul. 6, 2001 (JP) ........................................ 2001-206927

(51) Int. Cl.$^7$ .......................................... G02F 1/1335
(52) U.S. Cl. ...................... 349/113; 349/114; 349/115
(58) Field of Search ................................ 349/113, 114, 349/115

(56) References Cited

U.S. PATENT DOCUMENTS 5,691,791 A * 11/1997 Nakamura et al. .......... 349/113
6,219,119 B1 * 4/2001 Nakai .......................... 349/113

FOREIGN PATENT DOCUMENTS

JP      11-326615      11/1999

* cited by examiner

*Primary Examiner*—Robert H. Kim
*Assistant Examiner*—George Y. Wang
(74) *Attorney, Agent, or Firm*—Oblon, Spivak, McClelland, Maier & Neustadt, P.C.

(57) ABSTRACT

A reflector has protuberances and recesses in each pixel region. The distances between the respective peaks of each two adjacent protuberances in the pixel region are distributed in the range from 5 $\mu$m to 15 $\mu$m. The incidence of peak distances within the range of ±0.5 $\mu$m from the most frequent peak distance ranges from 40% to 80%, and the area of regular reflection surfaces of the reflector tilted at angles of 4.5° or less to the principal surface of a substrate in the pixel region accounts for 35% or less of the area of the pixel region.

10 Claims, 12 Drawing Sheets

Region A

Region B

Region C

LIQUID CRYSTAL DISPLAY UNIT

CROSS-REFERENCE TO RELATED APPLICATIONS

This application is based upon and claims the benefit of priority from the prior Japanese Patent Application No. 2001-206927, filed Jul. 6, 2001, the entire contents of which are incorporated herein by reference.

BACKGROUND OF THE INVENTION

1. Field of the Invention

The present invention relates to a liquid crystal display unit, and more particularly, to a liquid crystal display unit having a reflecting function.

2. Description of the Related Art

Modern liquid crystal display units are used in various apparatuses, such as personal computers, TV sets, word processors, portable telephones, etc. While the range of application of the liquid crystal display units becomes wider and wider, there are increasing demands for reduction in their size, power consumption, and cost.

On the other hand, reflection-type liquid crystal display units have been developed. Since the liquid crystal display units of this type utilize outside light for image display, they require no internal light source such as a backlight. Accordingly, there is a possibility of the reflection-type liquid crystal display units meeting the aforesaid demands.

In these reflection-type liquid crystal display units, outside light is reflected by a reflector and optically modulated by means of a liquid crystal layer, whereby it is displayed as an image on a display screen. The brightness of the outside light, which depends on the installation environment of the display unit, is not so stable as that of the backlight. In order to display bright images, therefore, it is essential to minimize the attenuation of the intensity of the outside light. In particular, the reflecting properties of the reflector considerably influence the attenuation of the light intensity. Thus, optimization has been tried to obtain reflecting properties such that outside light beams incident at all angles can be reflected efficiently.

BRIEF SUMMARY OF THE INVENTION

The present invention has been contrived in consideration of these circumstances, and its object is to provide a liquid crystal display unit capable of displaying images of a satisfactory display quality level.

A liquid crystal display unit according to an aspect of the invention comprises a liquid crystal layer sandwiched between first and second substrates, the first substrate including a reflector for reflecting incident light guided through the second substrate and the liquid crystal layer, the reflector having a plurality of protuberances and recesses in each pixel region, the distances between the respective peaks of each two adjacent protuberances in the pixel region being distributed in the range from 5 μm to 15 μm, with the incidence of peak distances within the range of ±0.5 μm from the most frequent peak distance ranging from 40% to 80%, the area of regular reflection surfaces of the reflector tilted at angles of 4.5° or less to the principal surface of the first substrate in the pixel region accounting for 35% or less of the area of the pixel region.

A liquid crystal display unit according to another aspect of the invention comprises a liquid crystal layer sandwiched between first and second substrates, the first substrate including a reflector for reflecting incident light guided through the second substrate and the liquid crystal layer, the reflector having a plurality of protuberances and recesses in each pixel region, the distances between the respective peaks of each two adjacent protuberances in the pixel region being distributed in the range from 5 μm to 15 μm, with the incidence of peak distances within the range of ±0.5 μm from the most frequent peak distance ranging from 40% to 80%, the average height from the bottom of the recess to the peak of each protuberance thereof ranging from 0.1 μm to 1.2 μm.

According to this invention, generation of interference fringes attributable to reflected light can be restrained by reducing regular reflection components of outside light incident upon the liquid crystal display unit that are not conducive to the brightness of display and suitably distributing the protuberances. Thus, substantially ideal reflecting properties can be realized, and very bright, high-quality uniform images can be displayed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A liquid crystal display unit according to an embodiment of the present invention will now be described with reference to the accompanying drawings.

Figure 1:
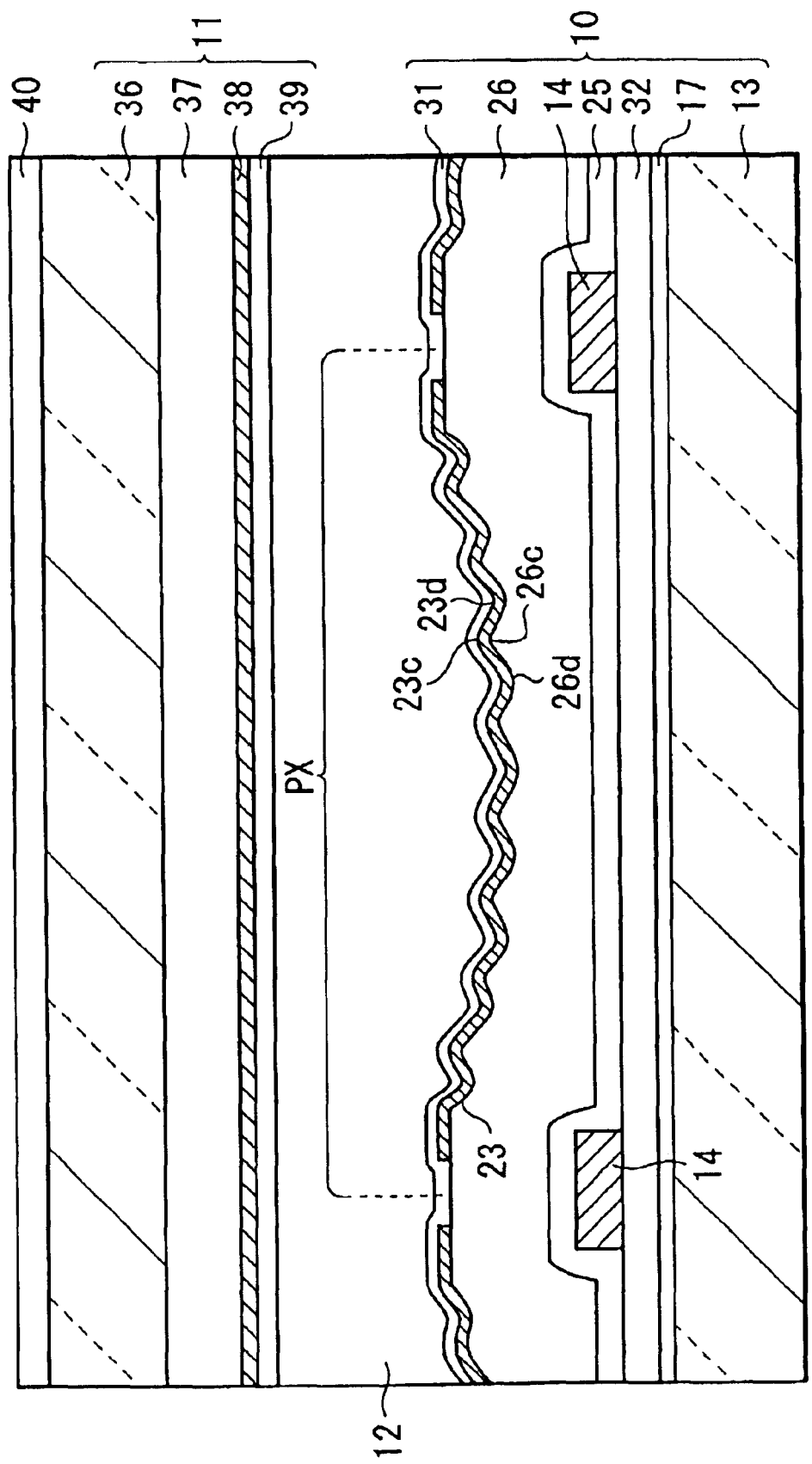
FIG. 1 is a sectional view schematically showing the construction of a pixel of a reflection-type liquid crystal display unit according to an embodiment of the invention and its surroundings.
Figure 2:
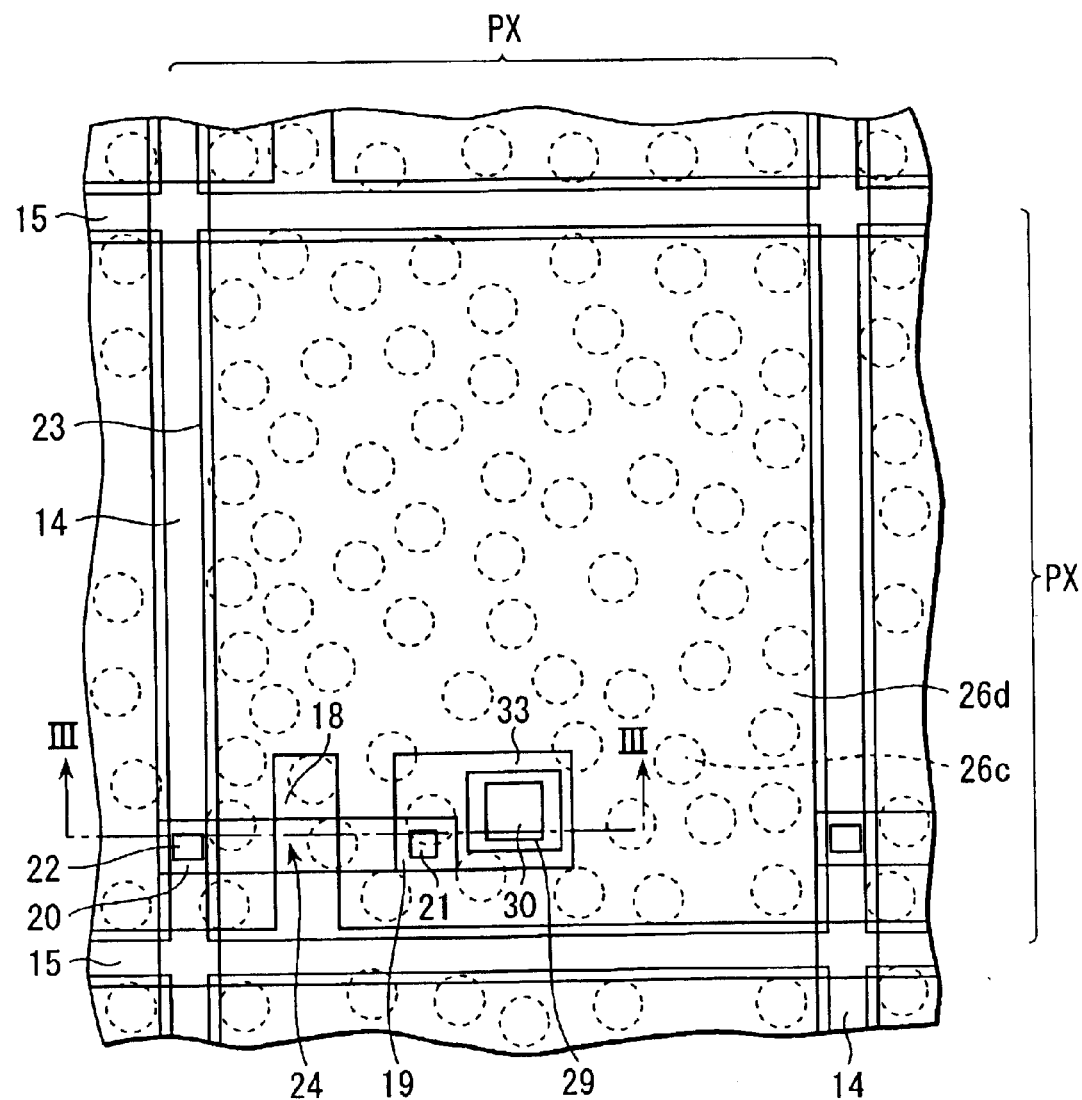
FIG. 2 is a plan view schematically showing the construction of the pixel of FIG. 1 and its surroundings.
Figure 3:
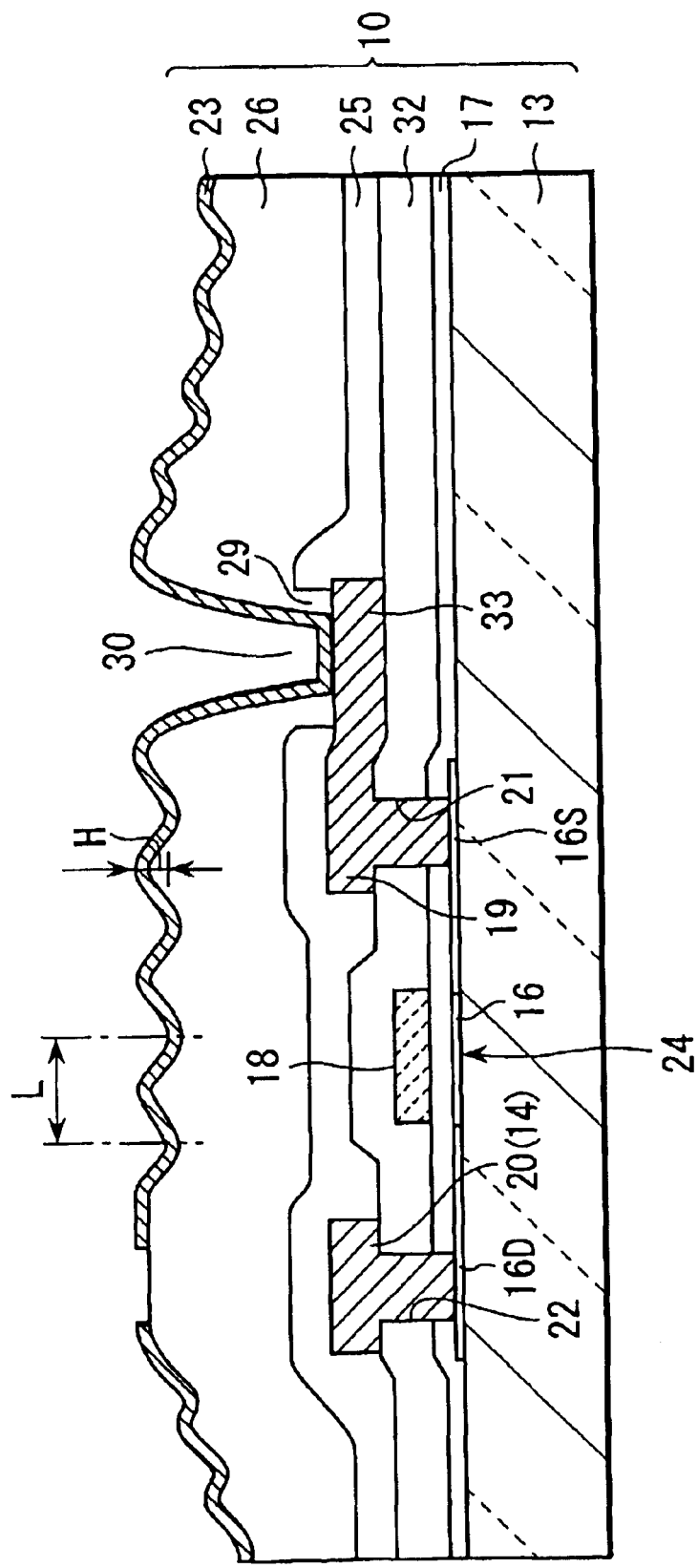
FIG. 3 is a sectional view taken along line III—III of FIG. 2, schematically showing the construction.

As shown in FIGS. 1 to 3, the liquid crystal display unit comprises an array substrate 10 for use as a first substrate, a counter substrate 11 as a second substrate, and a liquid crystal layer 12 sandwiched between the substrates 10 and 11.

The array substrate 10 is composed of an insulating substrate 13 of glass or the like, pixel electrodes 23, signal lines 14, scanning lines 15, thin-film transistors (TFTs) 24 for pixels for use as switching elements, an alignment film 31, etc. The pixel electrodes 23 are formed of a reflective metallic material and are arranged in a matrix on the insulating substrate 13. The signal lines 14 are arranged along the columns of the pixel electrodes 23. The scanning lines 15 are arranged along the rows of the pixel electrodes 23. The TFTs 24 are located individually near the points of intersection of their corresponding scanning lines 15 and signal lines 14. The alignment film 31 is located so as to cover the pixel electrodes 23.

The counter substrate 11 is composed of an insulating substrate 36 of transparent glass or the like, a colored layer 37 for use as a color filter, a counter electrode 38, an alignment film 39, etc. The colored layer 37 is located covering the insulating substrate 36. The colored layer 37 is formed of a resin layer that transmits optical components, e.g., red, green, and blue. The counter electrode 38 is located covering the colored layer 37, and is formed of a transparent metallic material. The alignment film 39 is located covering the counter electrode 38. Further, a polarization plate 40 is stuck on the insulating substrate 36 on the side remoter from the colored layer 37.

In this liquid crystal display unit of the reflection type, the liquid crystal layer 12 is divided into a plurality of pixel regions PX corresponding to the reflective pixel electrodes 23, individually. Each pixel region PX is located between its corresponding two adjacent scanning lines 15 and its corresponding two adjacent signal lines 14. Each TFT 24 is turned on in response to a scanning pulse that is supplied from its corresponding scanning line 15, and supplies the potential of its corresponding signal line 14 to its corresponding reflective pixel electrode 23. Each pixel electrode 23 applies the potential of its corresponding signal line 14 as a pixel potential to its corresponding pixel region PX of the liquid crystal layer 12. The transmittance of the pixel region PX is controlled in accordance with the difference between the pixel potential and the potential of the counter electrode 38.

In the array substrate 10, each TFT 24 is composed of a semiconductor layer 16, gate electrode 18, source electrode 19, and drain electrode 20. The semiconductor layer 16 is formed of amorphous silicon or poly-silicon and is located on the insulating substrate 13. The semiconductor layer 16, along with the insulating substrate 13, is covered by a gate insulating film 17. The gate electrode 18 is insulated from the semiconductor layer 16 by the gate insulating film 17, and is formed integrally with its corresponding scanning line 15 on the gate insulating film 17. The gate electrode 18 and the scanning line 15, along with the gate insulating film 17, are covered by a layer insulating film 32.

On the opposite sides of the gate electrode 18, individually, the source electrode 19 and the drain electrode 20 come into contact with the semiconductor layer 16 through contact holes 21 and 22, respectively, and are connected to the reflective pixel electrode 23 and the signal line 14 corresponding thereto, respectively. More specifically, the contact holes 21 and 22 are formed in the layer insulating film 32 and the gate insulating film 17 so that a source region 16S and a drain region 16D, which are formed in the semiconductor layer 16 on the opposite sides of the gate electrode 18, individually, are exposed through them.

The source electrode 19 is located on the layer insulating film 32, and comes into contact with the source region 16S of the semiconductor layer 16 through the contact hole 21. Further, the source electrode 19 is formed integrally with an extension source electrode 33 on the layer insulating film 32. The drain electrode 20 is located on the layer insulating film 32, and comes into contact with the drain region 16D of the semiconductor layer 16 through the contact hole 22. Further, the drain electrode 20 is formed integrally with its corresponding signal line 14 on the layer insulating film 32. The source electrode 19, extension source electrode 33, drain electrode 20, and signal line 14, along with the layer insulating film 32, are covered by a protective insulating film 25.

The protective insulating film 25 has a contact hole 29 through which the extension source electrode 33 is partially exposed, and is covered by an organic insulating film 26. The organic insulating film 26 has a contact hole 30 corresponding to the contact hole 29 of the protective insulating film 25. The extension source electrode 33 is partially exposed through the contact hole 30. The reflective pixel electrode 23 is located on the organic insulating film 26, and comes into contact with the extension source electrode 33 in the contact holes 29 and 30. The pixel electrode 23 is covered by the alignment film 31.

The organic insulating film 26 has an upper surface formed of an undulation that bulges in a plurality of positions in each pixel region PX. This undulation is composed of a plurality of hemispherical protuberances 26c that are arranged at random within the range of the pixel region PX and a recesses 26d that surrounds the protuberances 26c.

The reflective pixel electrode 23 serves as a reflector that scatters light projected from the side of the counter substrate 11 and landed via the liquid crystal layer 12 with high reflectance. The electrode 23 is formed of a material such as silver, aluminum, nickel, chromium, or an alloy of any of these metals. The electrode 23 is formed having a given thickness along the upper surface of the organic insulating film 26. Thus, the reflective pixel electrode 23 has undulation that are formed of protuberances 23c corresponding to the protuberances 26c of the organic insulating film 26 and recesses 23d corresponding to the recesses 26d of the film 26 in the pixel region PX.

In the reflection-type liquid crystal display unit constructed in this manner, it is essential to utilize surrounding outside light as efficiently as possible to brighten the display screen. Accordingly, the reflectors mounted in this display unit are expected to play very great roles and efficiently utilize outside light beams incident at all angles. Thus, reflectors with optimum reflecting properties are now under review.

Figure 4:
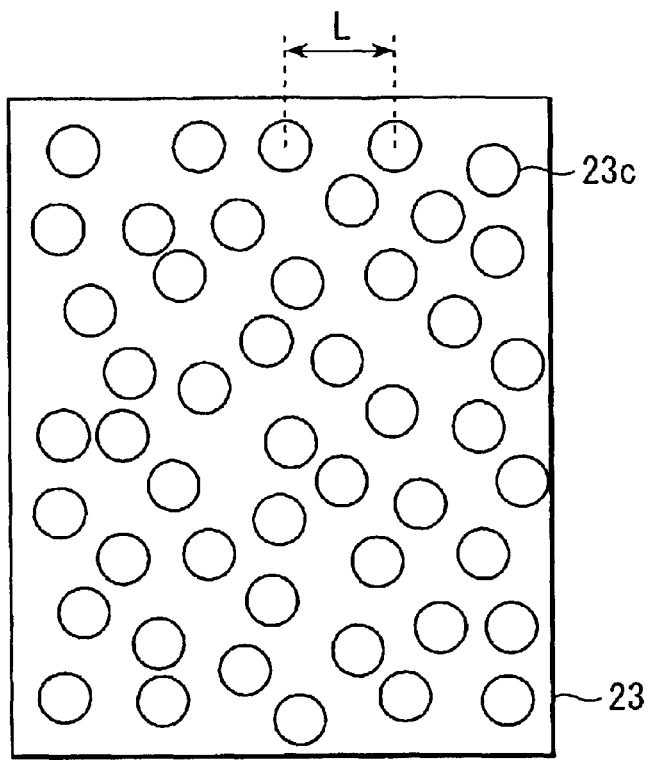
FIG. 4 is a plan view schematically showing a configuration of a reflector having conventional protuberances and recesses.
Figure 5:
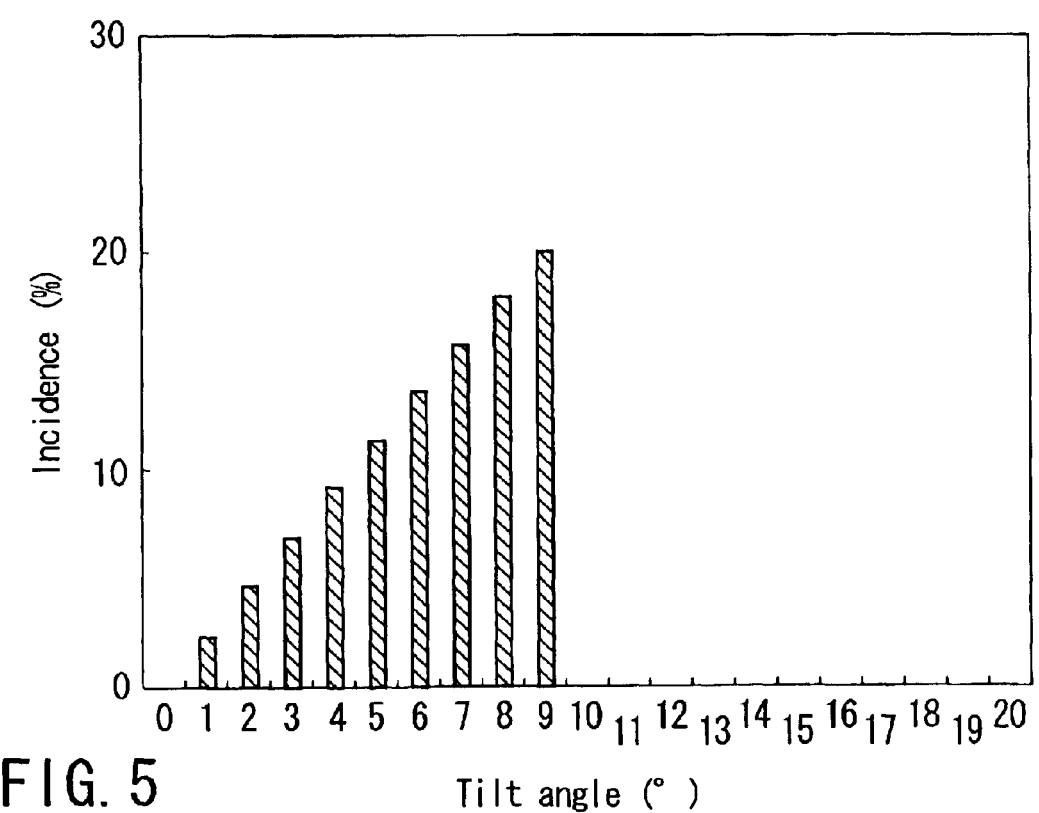
FIG. 5 is a diagram showing an ideal tilt angle distribution.

An attempt is made to focus scattered light beams on a region within a fixed range or enhance the intensity of the scattered light beams as viewed in a specific direction by arranging the protuberance patterns 23c at random on the surface of the reflective pixel electrode 23, as shown in FIG. 4, for example. FIG. 5 shows an ideal tilt angle distribution of protuberances and recesses, which is theoretically reviewed in Jpn. Pat. Appln. KOKAI Publication No. 11-326615. This tilt angle distribution is defined as the incidence of the tilt angles of the protuberances and recesses within the range of ±0.5° from given tilt angles (0°, 1°, 2°, 3° . . . ) to the principal surface of the array substrate (occupancy of surfaces at the tilt angles to the pixel region). This also applies to the following description. According to a reflector that has the tilt angle distribution shown in FIG. 5, a uniform optical density can be obtained for all the light scattering angles, and besides, its brightness can be improved by restricting the scattering direction. Thus, very bright, uniform display can be enjoyed.

Actually, however, it is hard to realize the tilt angle distribution shown in FIG. 5. The rugged configuration of the reflector is reflective of the surface configuration of its ground insulating film. Since the rugged surface of a ground film is generally obtained by isotropic etching, it is hard optionally to control the incidence of the tilt angles.

More specifically, the surface configuration of the ground film can be obtained by a known photolithographic process. The regularity or irregularity of the arrangement of the protuberances is induced by means of resist patterns for patterning the ground film. If the regularity of the protuberances and recesses is enhanced, reflective light components interfere with one another, thereby generating interference fringes, so that the display is subject to variation in density, that is, the display quality level lowers. If the protuberances and recesses are arranged at random to prevent this, on the other hand, relatively flat regular reflective surfaces are formed in those regions where the distances between the respective peaks of the adjacent protuberances are long or short, so that regular reflection components increase.

Thus, in the regions where the resist patterns are distant (or where the distances between the respective peaks of the protuberances manufactured with the patterns are long), most of the ground film between the protuberances is removed, so that the shape of the reflector is further reflective of the flat shape of the ground. In the regions where the resist patterns are arranged very close to one another (or where the distances between the respective peaks of the protuberances manufactured with the patterns are short), the ground film is etched only slightly, and no substantial tilt angles are created.

Figure 6:
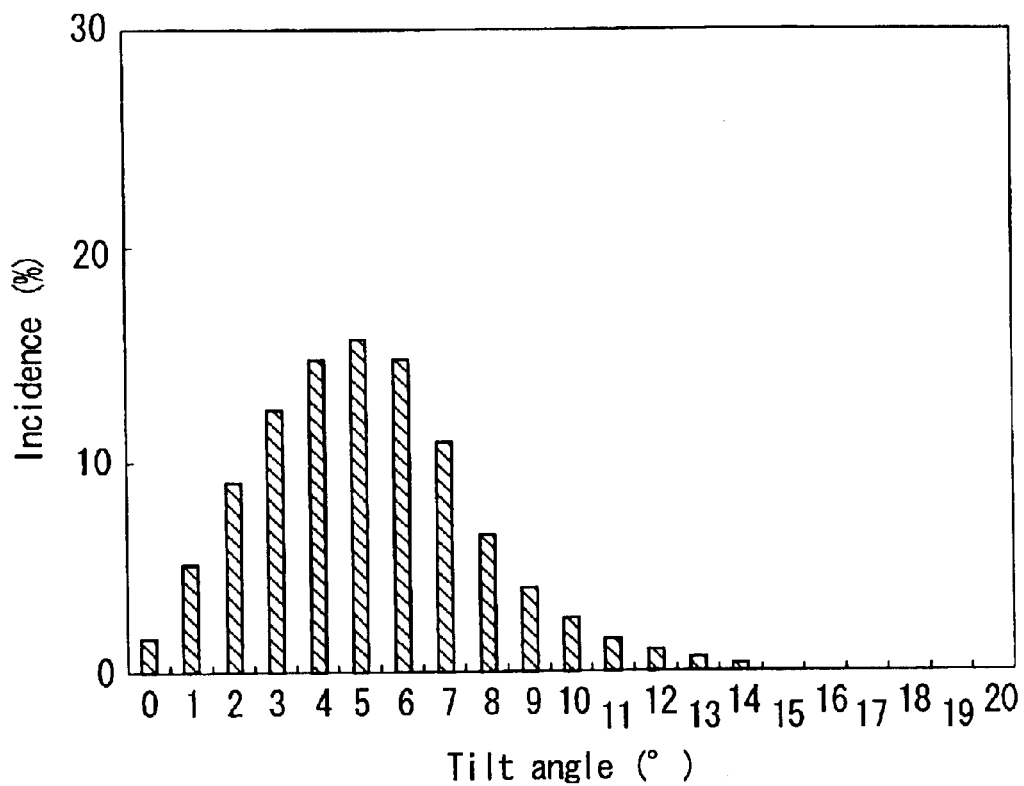
FIG. 6 is a diagram showing the tilt angle distribution of the reflector having the conventional protuberances and recesses.

If the protuberances and recesses are arranged at random in the manner shown in FIG. 4, the tilt angle distribution involves a very high incidence for the tilt angles that are conducive to regular reflection, as shown in FIG. 6, so that the display quality level is not satisfactory. If there are many regular reflection components in outside light, light sources are unexpectedly reflected in the display screen. Since an observer removes the light sources from the range of vision, therefore, the regular reflection components are not conducive to the brightness of display, actually. In consequence, the observer can never enjoy satisfactory brightness, and feels the display screen to be dark.

An examination conducted by the inventors hereof indicates that the incidence of the reflective surfaces whose tilt angles to the regions conducive to regular reflection or the array substrate range from 0° to 4.5° should be reduced to 35% or less, and preferably, that the incidence of the surfaces whose tilt angles range from 0° to 2.0° should be reduced to 20% or less.

The inventors hereof tried to solve this problem by optimizing the arrangement of the protuberances. More specifically, a mask pattern for exposing a resist is formed so that the protuberances are distributed substantially normally with the distances between their respective peaks ranging from 5 $\mu$m to 15 $\mu$m. This mask pattern has circular apertures that correspond to the protuberances, individually. The distances between the respective centers of the apertures can be controlled at pitches of 0.5 $\mu$m. In other words, the distances between the respective peaks of the protuberances can be controlled at pitches of 0.5 $\mu$m.

In this case, the tilt angle distribution of the protuberances and recesses that are formed on the surface of reflector in the aforesaid manner depends on a distance L between the respective peaks of each two adjacent protuberances 23c.

Figure 7:
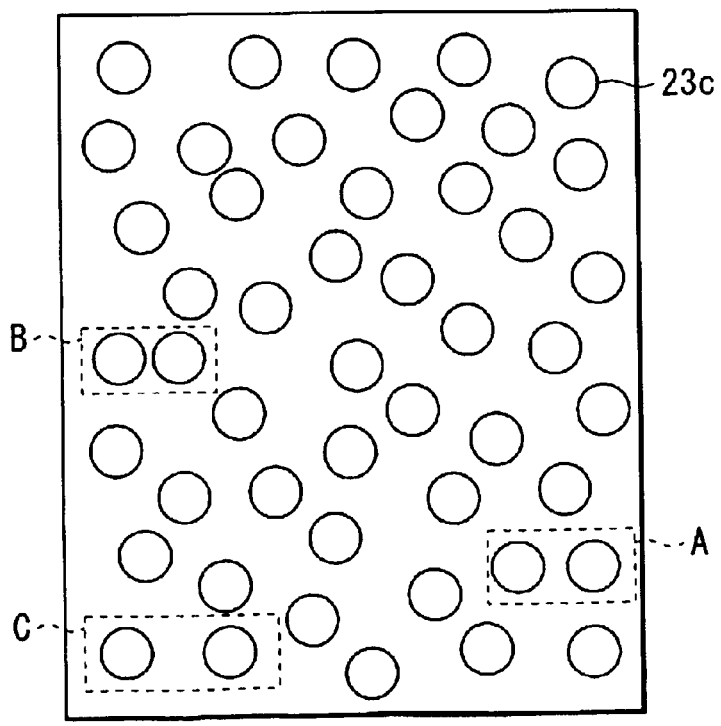
FIG. 7 is a plan view schematically showing a configuration of a reflector having protuberances arranged at different distances.
Figure 8:
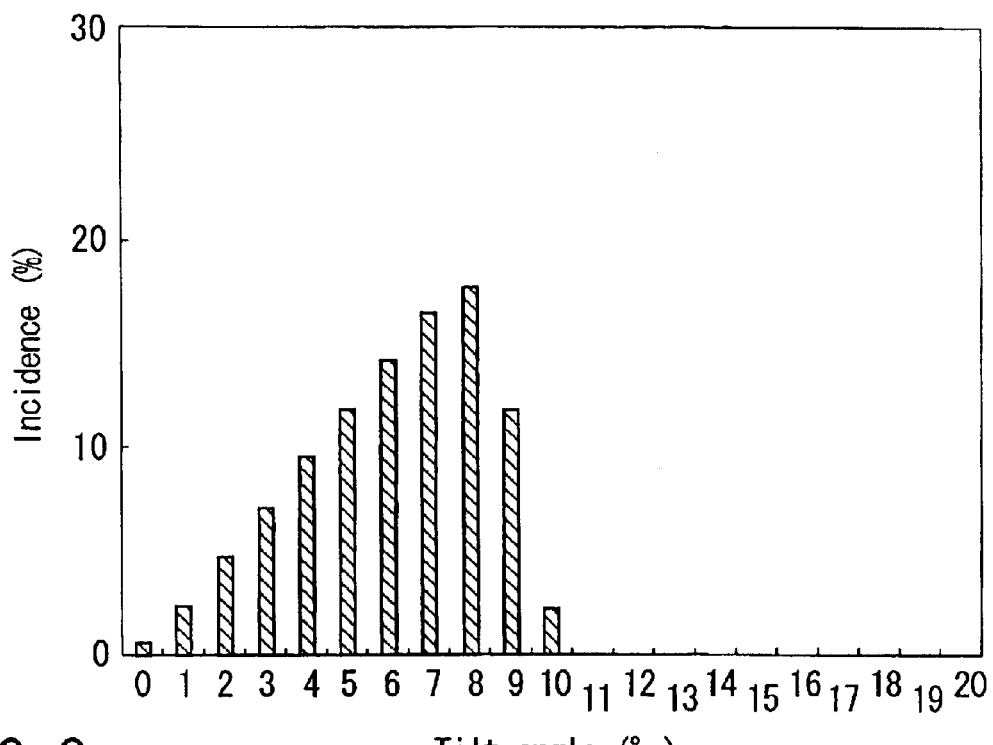
FIG. 8 is a diagram showing the tilt angle distribution of protuberances in a region A shown in FIG. 7.
Figure 11A:
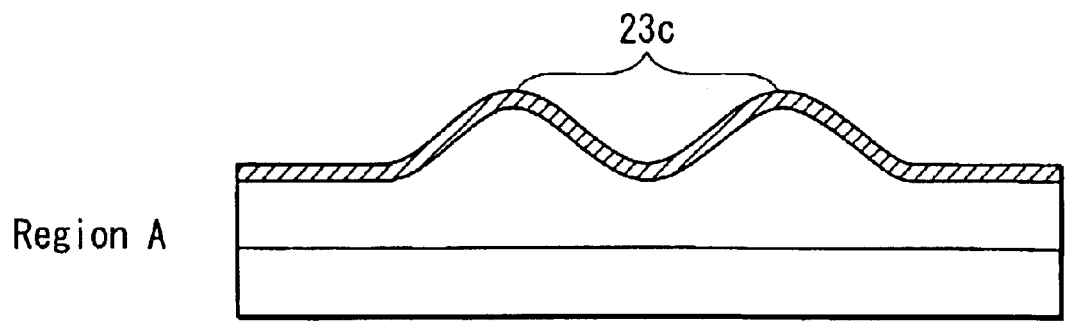
FIG. 11A is a sectional view schematically showing the construction of the protuberances in the region A shown in FIG. 7.

Let it be supposed that there are three divided region including a region A in which the peak distance L between the adjacent protuberances 23c is about 10 $\mu$m, a region B in which the peak distance between the adjacent protuberances 23c is about 8 $\mu$m, and a region C in which the peak distance between the adjacent protuberances 23c is about 12 $\mu$m, as shown in FIG. 7, for example. In the profile of the region A of FIG. 7, there are hardly any regular reflection portions (flat portions with the tilt angle of 0°) between the adjacent protuberances 23c, as shown in FIG. 11A. As shown in FIG. 8, therefore, the tilt angle distribution of region A resembles the ideal tilt angle distribution (FIG. 5).

Figure 9:
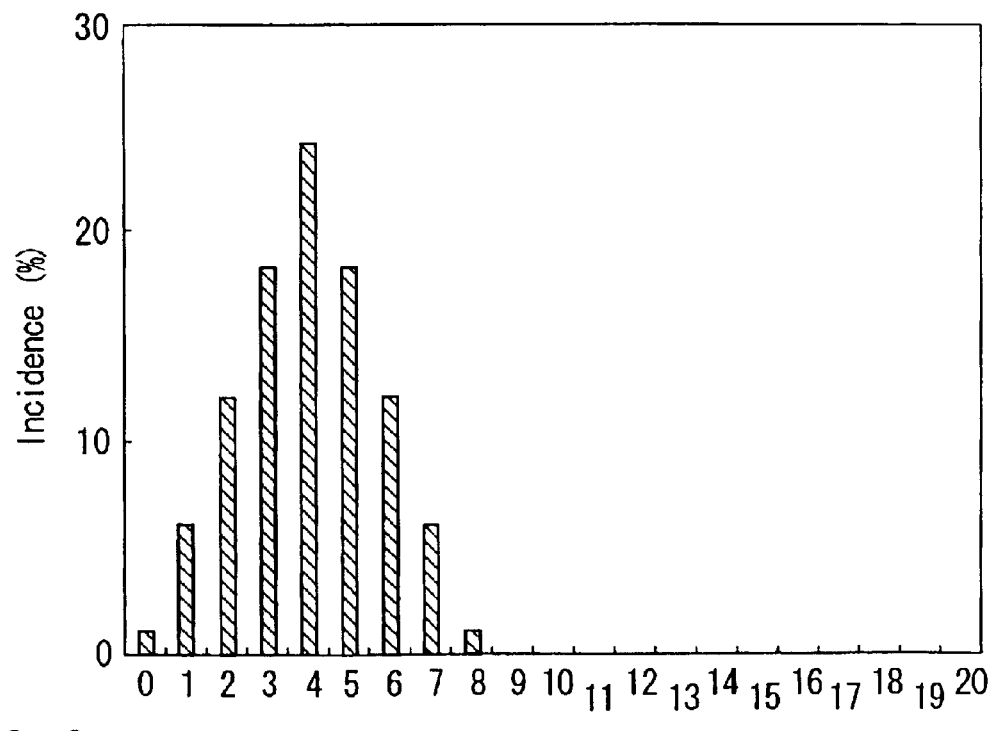
FIG. 9 is a diagram showing the tilt angle distribution of protuberances in a region B shown in FIG. 7.
Figure 11B:
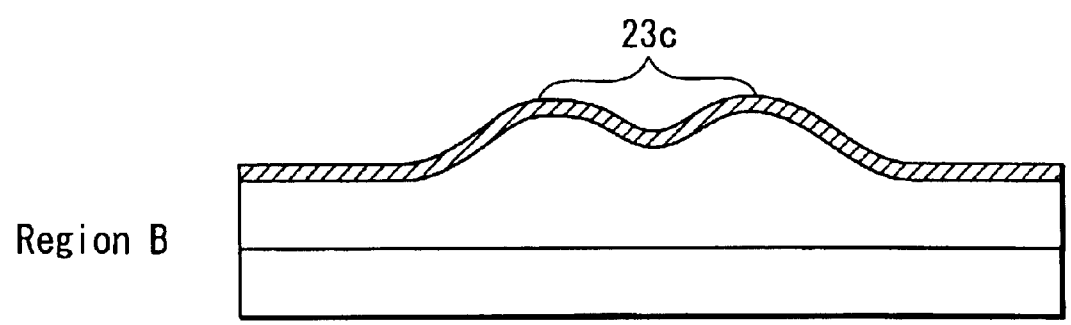
FIG. 11B is a sectional view schematically showing the construction of the protuberances in the region B shown in FIG. 7.

If the peak distance of the adjacent protuberances 23c is as short as about 8 $\mu$m as in the region B shown in FIG. 11B, on the other hand, the respective skirt portions of the protuberances 23c overlap each other. Thus, the tilt is gentle. In the tilt angle distribution of the region B, therefore, the incidence of the tilt angles that are conducive to regular reflection of 0° to 4.5° increases, as shown in FIG. 9.

Figure 10:
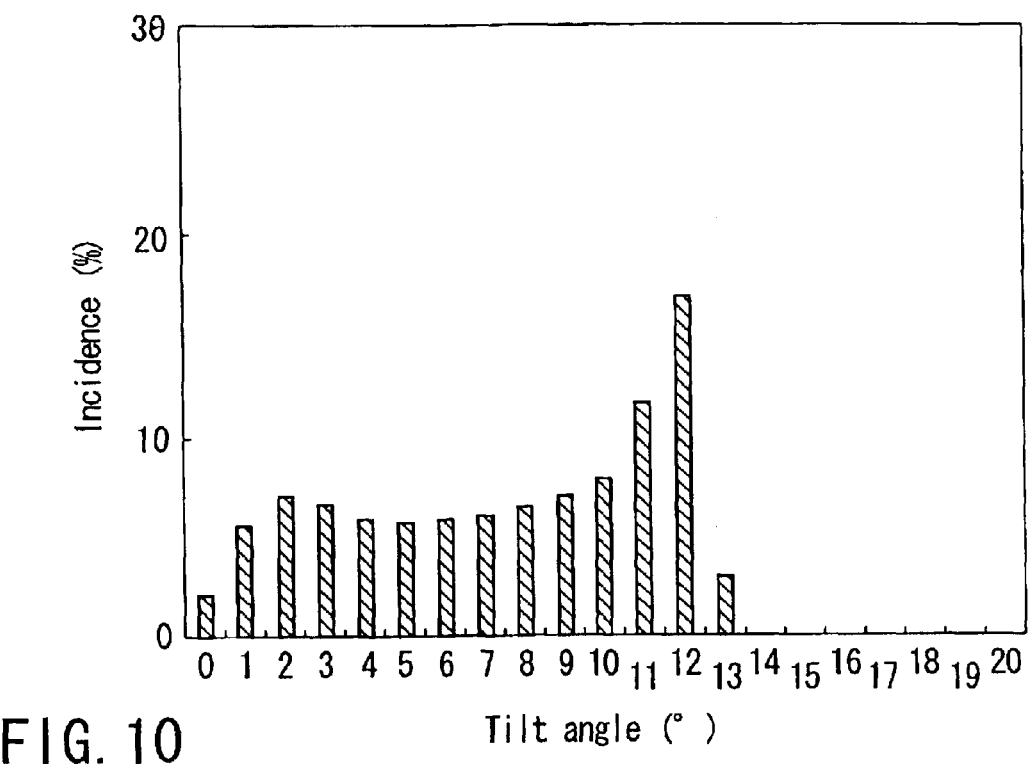
FIG. 10 is a diagram showing the tilt angle distribution of protuberances in a region C shown in FIG. 7.
Figure 11C:
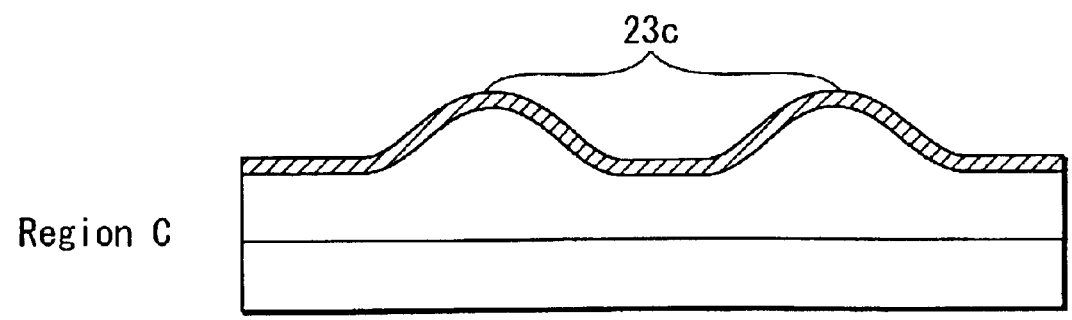
FIG. 11C is a sectional view schematically showing the construction of the protuberances in the region C shown in FIG. 7.

If the peak distance of the adjacent protuberances 23c is as long as about 12 $\mu$m as in the region C shown in FIG. 11C, moreover, a flat portion or regular reflection portion is formed between the protuberances 23c. In the tilt angle distribution of the region C, therefore, the incidence of the tilt angles that are conducive to regular reflection increases, as shown in FIG. 10.

Thereupon, the display quality level was evaluated with the peak distance distribution of the protuberances changed variously. The protuberances are arranged at random so that they are distributed substantially normally with the distances between their respective peaks ranging from 5 $\mu$m to 15 $\mu$m. If the peak distance ranges from 5 $\mu$m to 15 $\mu$m, the peak distance that exists at the highest incidence is 10 $\mu$m. However, the most frequent peak distance is not always 10 $\mu$m, and can be about 9.5 $\mu$m if the peak distances are distributed within the range from, e.g., 6 $\mu$m to 13 $\mu$m, which is covered by the range from 5 $\mu$m to 15 $\mu$m. In any case, the most frequent peak distance can be obtained by measurement.

If the incidence of the peak distances within the range of ±0.5 $\mu$m from the most frequent peak distance d is 40% or more, there is no possibility of light sources being unexpectedly reflected in the display screen, and practically satisfactory brightness can be attained. As mentioned later, the incidence of the peak distance can be obtained as the quotient of the area of each of regions at distances within the range of ±0.5 μm from the most frequent peak distance divided by the area of the whole region of distribution. This calculation is based on a histogram of peak distances graduated by 0.5 μm. In general, the peak of a protuberance can be regarded as its highest point. If the protuberance is formed by isotropic etching, as in this example, its peak can be regarded as its center.

For further detailed examination, a tilt angle distribution was obtained for the surface configuration of the reflector manufactured under the conditions described above. The tilt angle is the angle formed between the reflective surface in any region and the principal surface of the array substrate. It was found that the area of surfaces at tilt angles of 0° to 4.5° account for 35% or less of the area of the pixel region. It was found that the area ratio of 35% or less is highly conducive to the elimination of unexpected reflection, since the surfaces at the tilt angles of 4.5° or less form regular reflection surfaces that are particularly conducive to regular reflection.

From another point of view, it was found that light sources or the like cannot be unexpectedly reflected in the display screen if the incidence of the peak distances within the range of ±0.5 μm from the most frequent peak distance d is 40% or more and if the average of protuberance heights (peak-to-peak values for the distances from the respective peaks of the protuberances to the peak of the recesses) range from 0.1 μm to 1.2 μm. Thus, if the protuberance height is extremely small, the tilt between the protuberances is so gentle that the regular reflection region increases even though the incidence of the peak distances within the range of ±0.5 μm from the most frequent peak distance d is 40% or more. If the protuberance height is extremely great, in contrast with this, effective diffuse reflection cannot be caused with ease, so that practically satisfactory brightness cannot be attained. When the protuberance height was set within the aforesaid range, satisfactory brightness was obtained without involving unexpected reflection of outside light. This is conceivable because the area ratio of the regular reflection surfaces is able to be restricted to 35% or less by adjusting the peak distance distribution and the protuberance height to the aforesaid rages.

On the other hand, it was also found that the optimum value of the incidence of the peak distances within the range of 0.5 μm from the most frequent peak distance d has an upper limit. When this incidence was too high, interference fringes were formed on the display screen, and the display quality level lowered considerably. The interference fringes can be supposed to have been caused because interference between reflected light components was intensified owing to the enhanced regularity of the protuberance arrangement.

The upper limit of the incidence was reviewed. No interference fringes were visually observed when the incidence of the peak distances within the range of ±0.5 μm from the most frequent peak distance d was adjusted to 80%. Thus, the interference between the reflected light components can be believed to have been reduced because the protuberance arrangement was invested with moderate irregularity.

The following is a description of a specific example of the present invention.

Figure 15A:
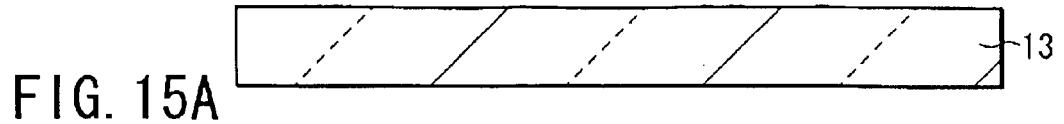
FIGS. 15A to 15F are views schematically showing processes for manufacturing an array substrate applicable to the reflection-type liquid crystal display unit shown in FIG. 1.

As shown in FIG. 15A, the insulating substrate 13 formed of a glass or quartz plate is prepared. Formed on the insulating substrate 13 are a semiconductor layer of polysilicon, gate insulating film of silicon oxide, gate electrodes and scanning lines formed of Ta, Cr, Al, Mo, W, Cu, etc. or a laminate or alloy film of these metals, layer insulating film of silicon oxide, signal lines, source electrodes, and extension source electrodes formed of Ta, Cr, Al, Mo, W, Cu, etc. or a laminate or alloy film of these metals, protective insulating film of silicon nitride, etc. Detailed illustration of the laminate structure is omitted.

Figure 15B:
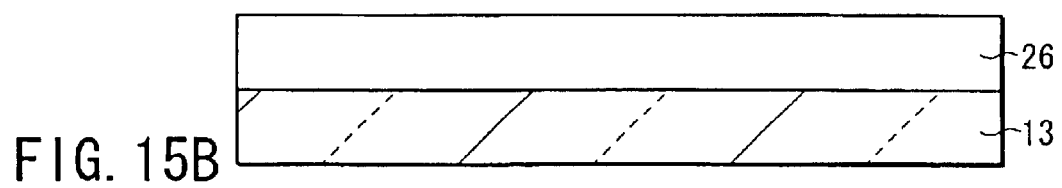

Subsequently, a positive-type photosensitive resin is spread to a thickness of about 1 μm to 4 μm by spin coating or the like, as shown in FIG. 15B, and the whole substrate is pre-baked. Thereupon, the organic insulating film 26 is completed.

Figure 15C:
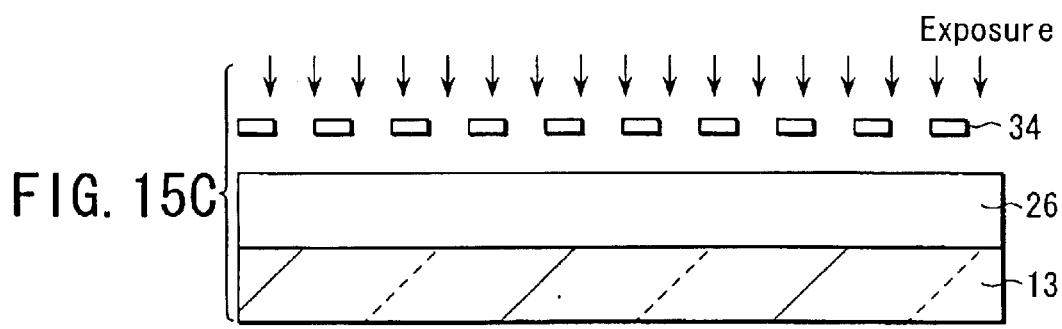

Then, the organic insulating film 26 in the pixel region PX is exposed with use of a photo mask 34 having circular shading portions that are arranged at random in consideration of the aforementioned peak distance distribution and tilt angle distribution, as shown in FIG. 15C. The shape and density of the protuberances and recesses formed on the surface of the organic insulating film 26 are controlled in accordance with the shapes of the shading portions and openings, density, exposure, etc. The patterns of the shading portions of the photo mask 34 have the shape of a circle with a diameter of about 5 μm each, and are arranged at random so that their incidence is 52% with the distances between the respective centers of the adjacent circular shading portions ranging from 9.5 μm to 10.5 μm. The exposure is settled within the range from 10 mJ to 200 mJ, depending on the necessary height of the protuberances (or depth of the recesses).

Figure 15D:
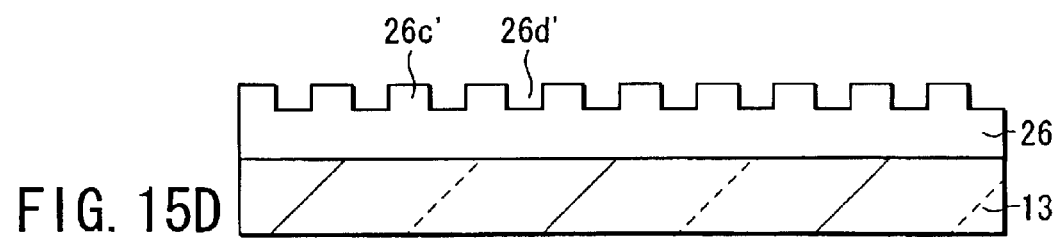

Subsequently, the organic insulating film 26 is developed, whereby the portion exposed in the exposure process is removed, as shown in FIG. 15D. Thereupon, a plurality of fine protrusions 26c' and a recesses 26d' surrounding them are formed on the surface of the insulating film 26. In this embodiment, the exposure obtained with use of the photo mask 34 is restricted within the range from 10 mJ to 200 mJ, so that the bottom of the recesses 26d' is situated near the upper surface of the organic insulating film 26 without reaching the protective insulating film that serves as the ground of the film 26.

Figure 15E:
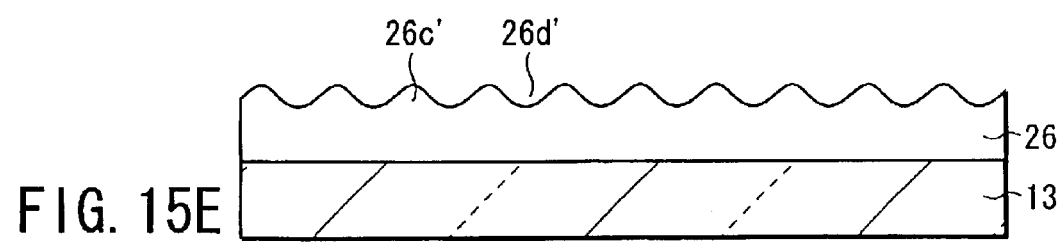

Then, the whole substrate is heated, as shown in FIG. 15E. Thereupon, the surface of the organic insulating film 26 is melted, so that the protrusions 26c' and the recesses 26d' are rounded and reshaped into the smooth, substantially hemispherical protuberances 26c and the recesses 26d that surrounds the protuberances 26c.

Figure 15F:
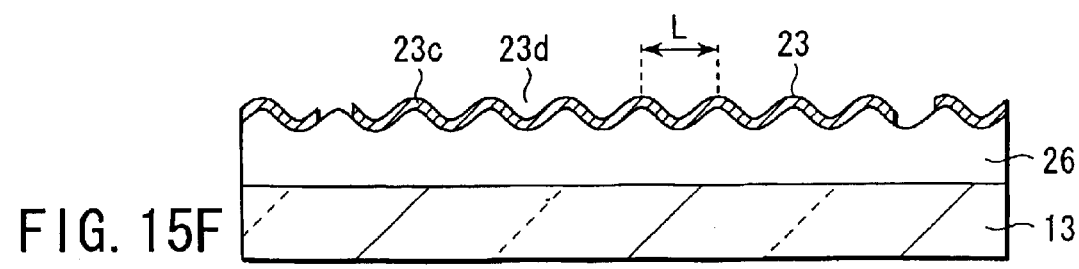

Subsequently, a metal film of Al, Ni, Cr, or Ag is formed with a thickness of about 100 nm on the organic insulating film 26 by sputtering, as shown in FIG. 15F, and then patterned into a given shape by photo-etching process. Thereupon, the reflective pixel electrode 23 is completed.

On the other hand, the counter substrate 11 is manufactured. More specifically, a glass or quartz plate is used as the transparent insulating substrate 36. Further, the colored layer 37 having a pigment dispersed therein is formed on the insulating substrate 36. The transparent counter electrode 38 is obtained by forming, e.g., an ITO on the colored layer 37 by sputtering.

The array substrate 10 and the counter substrate 11 are integrated after the alignment films 31 and 39 are formed. The alignment films 31 and 39 are formed by spreading cold-curing polyimide by printing and rubbing it.

The array substrate 10 and the counter substrate 11 obtained in this manner are arranged so that their respective alignment films 31 and 39 are internally opposed to each other, and are stuck together by means of a peripheral sealer with a predetermined gap between them. The liquid crystal layer 12 is obtained by injecting and sealing a liquid crystal such as a nematic liquid crystal into the gap between the array substrate 10 and the counter substrate 11. The polarization plate 40 is stuck to the insulating substrate 36 on the outer surface opposite from the colored layer 37. Thus, the reflection-type liquid crystal display unit is completed.

In the liquid crystal display unit according to this embodiment, the reflective pixel electrode 23 constitutes the reflector, which has the substantially hemispherical protuberances 23c that are arranged at random in each pixel region PX and the recesses 23d that surrounds the protuberances 23c.

Figure 13:
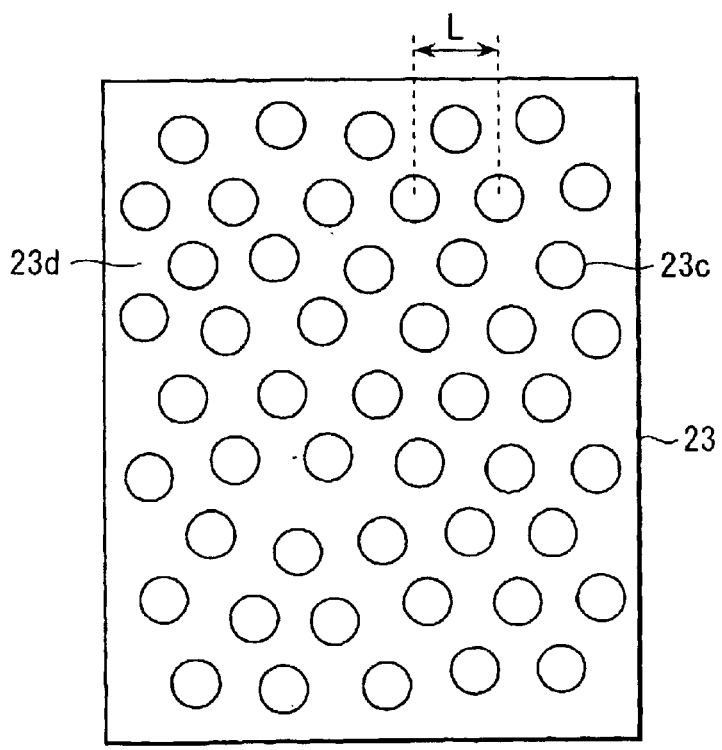
FIG. 13 is a plan view schematically showing a protuberance and recesses of a reflector applicable to the reflection-type liquid crystal display unit shown in FIG. 1.

The reflecting properties of the reflector manufactured in this manner and having the protuberances and recesses shown in FIG. 13 will now be compared with those of a conventional reflector having the protuberances and recesses shown in FIG. 4.

Figure 12:
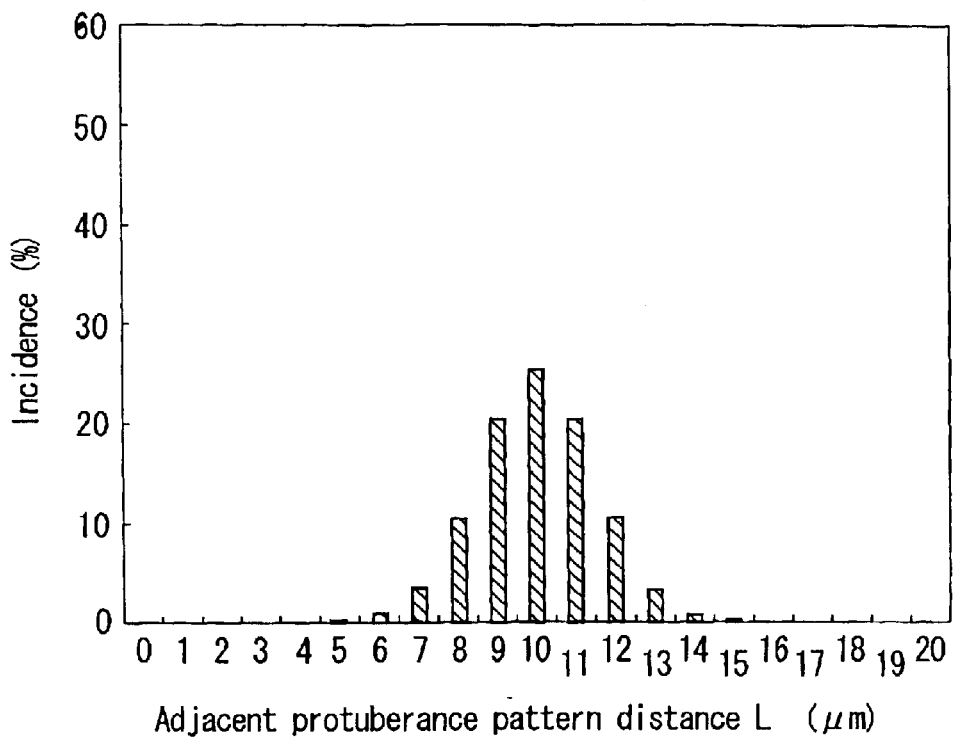
FIG. 12 is a diagram showing the peak distance distribution of the protuberances of the reflector having the conventional protuberances and recesses.

The protuberances and recesses of the conventional reflector shown in FIG. 4 have the peak distance distribution shown in FIG. 12. This peak distance distribution is defined as the incidence of the peak distances between the protuberances within the ranges of ±0.5 μm from given peak distances (0 μm, 1 μm, 2 μm, 3 μm . . . ). This also applies to the following description.

In the conventional reflector, as shown in FIG. 12, the peak distance distribution of the adjacent protuberances is extensive, and the protuberances are arranged at various distances. More specifically, the peak distances between the protuberances of the protuberances and recesses range from 4.5 μm to 15.5 μm, and the highest incidence of the peak distances in the given range (10 μm±0.5 μm in the example shown in FIG. 12) is only 26% or thereabout.

The protuberances and recesses of the reflector shown in FIG. 4 have a tilt angle distribution such as the one shown in FIG. 6. As shown in FIG. 6, the incidence of the tilt angles of 0° to 4.5° that are conducive to regular reflection is as high as 42%.

Even if the most frequent peak distance is adjusted to an optimum value (e.g., 10 μm±0.5 μm) such that the regular reflection components are suppressed, according to the reflector of this type, the peak distance distribution is so wide that even the highest incidence is lower than 40%. In the tilt angle distribution, therefore, the incidence of the tilt angles that are conducive to regular reflection cannot be restricted to 35% or less, so that the ideal tilt angle distribution shown in FIG. 5 cannot be obtained. This indicates that the reflection-type liquid crystal display unit cannot efficiently utilize surrounding outside light.

On the other hand, the reflector manufactured by the manufacturing method described above has the protuberances and recesses shown in FIG. 13. The protuberances and recesses formed in this manner have the following configuration. Thus, in the liquid crystal display unit according to this embodiment, the protuberances 23c can be arranged at random with the peak distance L between the adjacent protuberances 23c kept substantially uniform, as shown in FIG. 13. In this case, the most frequent peak distance L is adjusted to 10 μm±0.5 μm.

Figure 14:
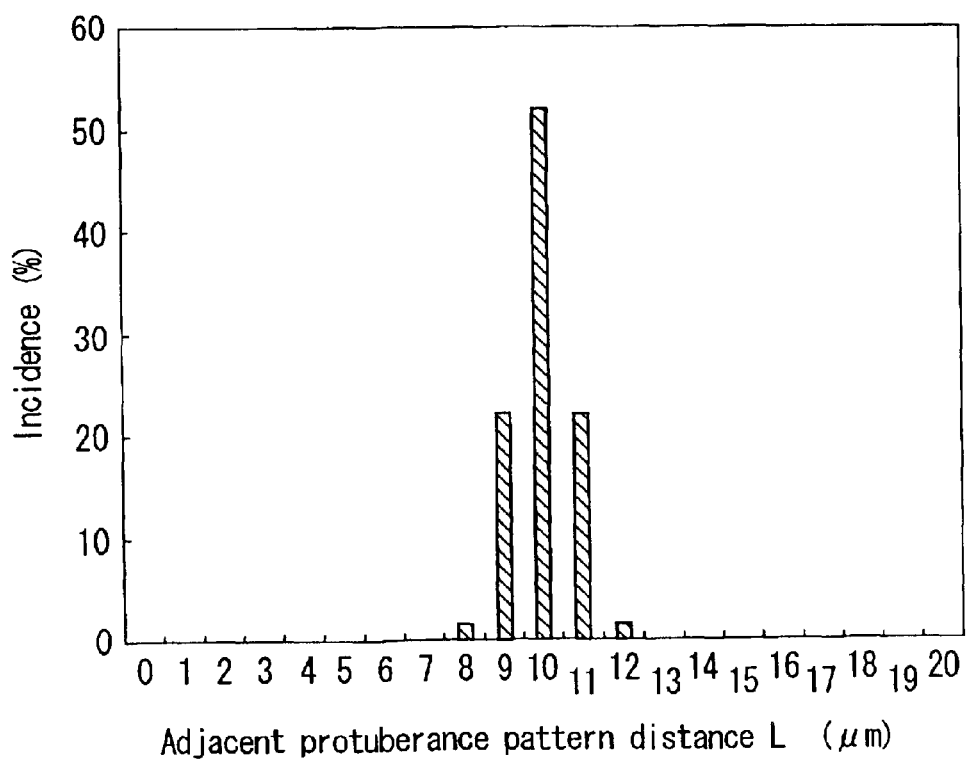
FIG. 14 is a diagram showing the peak distance distribution of the protuberances of the reflector shown in FIG. 13.

The protuberances and recesses of the reflector shown in FIG. 13 have a peak distance distribution such as the one shown in FIG. 14. As shown in FIG. 14, the peak distances between the protuberances of the protuberances and recesses range from 5 μm to 15 μm, and the incidences for the ranges of ±0.5 μm from the given peak distances range from 40% to 80%. In this embodiment, the peak distances between the protuberances range from 7.5 μm to 12.5 μm, and the incidences for the ranges of 10 μm±0.5 μm are 40% or more, and more exactly, at 52%.

Figure 16:
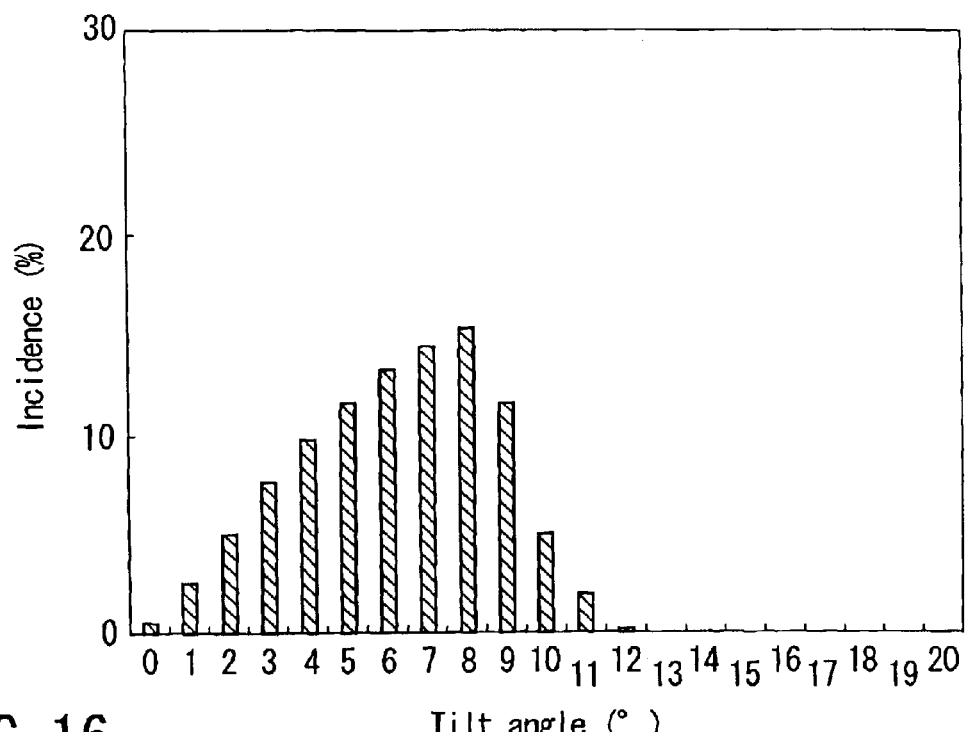
FIG. 16 is a diagram showing the tilt angle distribution of the protuberances of the reflector shown in FIG. 13.

Further, the protuberances and recesses of the reflector shown in FIG. 13 have a tilt angle distribution such as the one shown in FIG. 16. As shown in FIG. 16, the incidence of the tilt angles of the protuberances and recesses of 2.0° or less is 20% or less. According to this embodiment, the incidence of the tilt angles of 0° to 4.5° that are conducive to regular reflection can be reduced from 42% to 26%.

Furthermore, the average height of the protuberances ranges from 0.1 μm to 1.2 μm. In this embodiment, it is adjusted to 0.7 μm.

According to this reflector, the most frequent peak distance is adjusted to an optimum value (e.g., 10 μm±0.5 μm) such that the regular reflection components are suppressed, and the highest incidence is not lower than 40%. In the tilt angle distribution, therefore, the incidence of the tilt angles that are conducive to regular reflection can be restricted 35% or less. Thus, the tilt angle distribution is more similar to the ideal one shown in FIG. 5 than in the conventional case. Since the highest incidence is restricted to 80% or less, moreover, the peak distances can be somewhat distributed at random, and generation of interference fringes attributable to reflected light can be restrained.

Accordingly, substantially ideal reflecting properties can be realized, and components similar to regular reflection components that are not conducive to the brightness of display can be reduced. Thus, the resulting reflector is improved in brightness, uniformity, and display quality level.

In the embodiment described above, the most frequent peak distances are adjusted to the given range of 10 μm±0.5 μm, and their incidence is 52%. If the incidence is 40%, however, the tilt angle distribution can be fully approximated to the ideal one.

Figure 17:
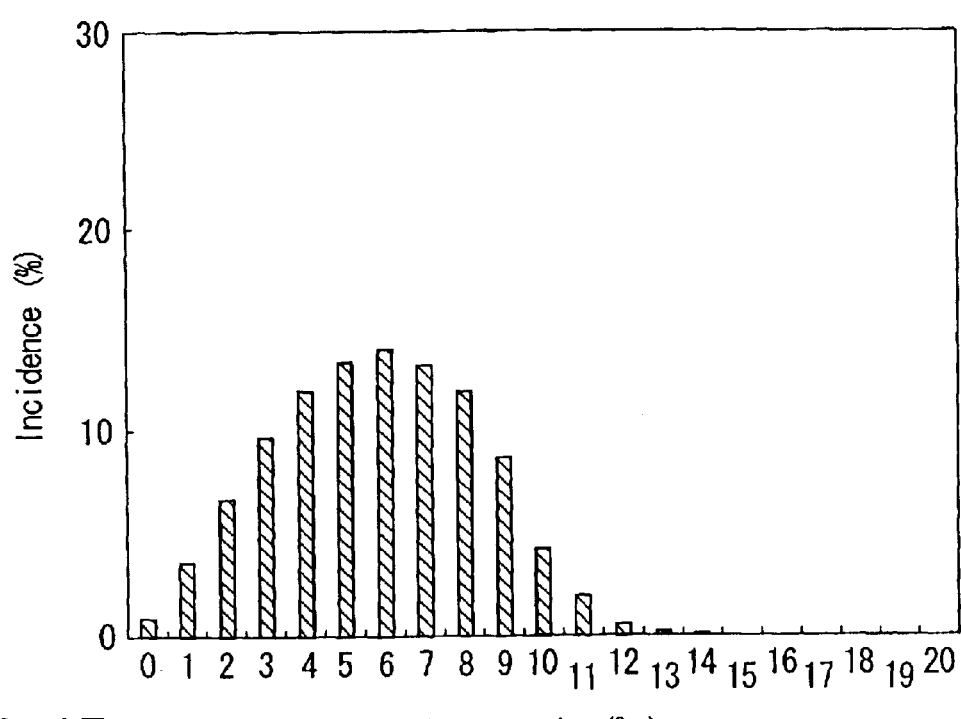
FIG. 17 is a diagram showing the tilt angle distribution of protuberances of another reflector applicable to the reflection-type liquid crystal display unit shown in FIG. 1.

FIG. 17 shows a tilt angle distribution for the case where the highest incidence of the peak distances in the given range is 40%. Even in this case, the incidence of the tilt angles of 0° to 4.5° that are conducive to regular reflection can be fully lowered, and moreover, the tilt angle distribution can be approximated to the ideal one shown in FIG. 5. As in the case of the foregoing embodiment, therefore, the efficiency of utilization of the surrounding outside light can be improved satisfactorily, so that the resulting reflector is improved in brightness, uniformity, and display quality level.

Figure 18:
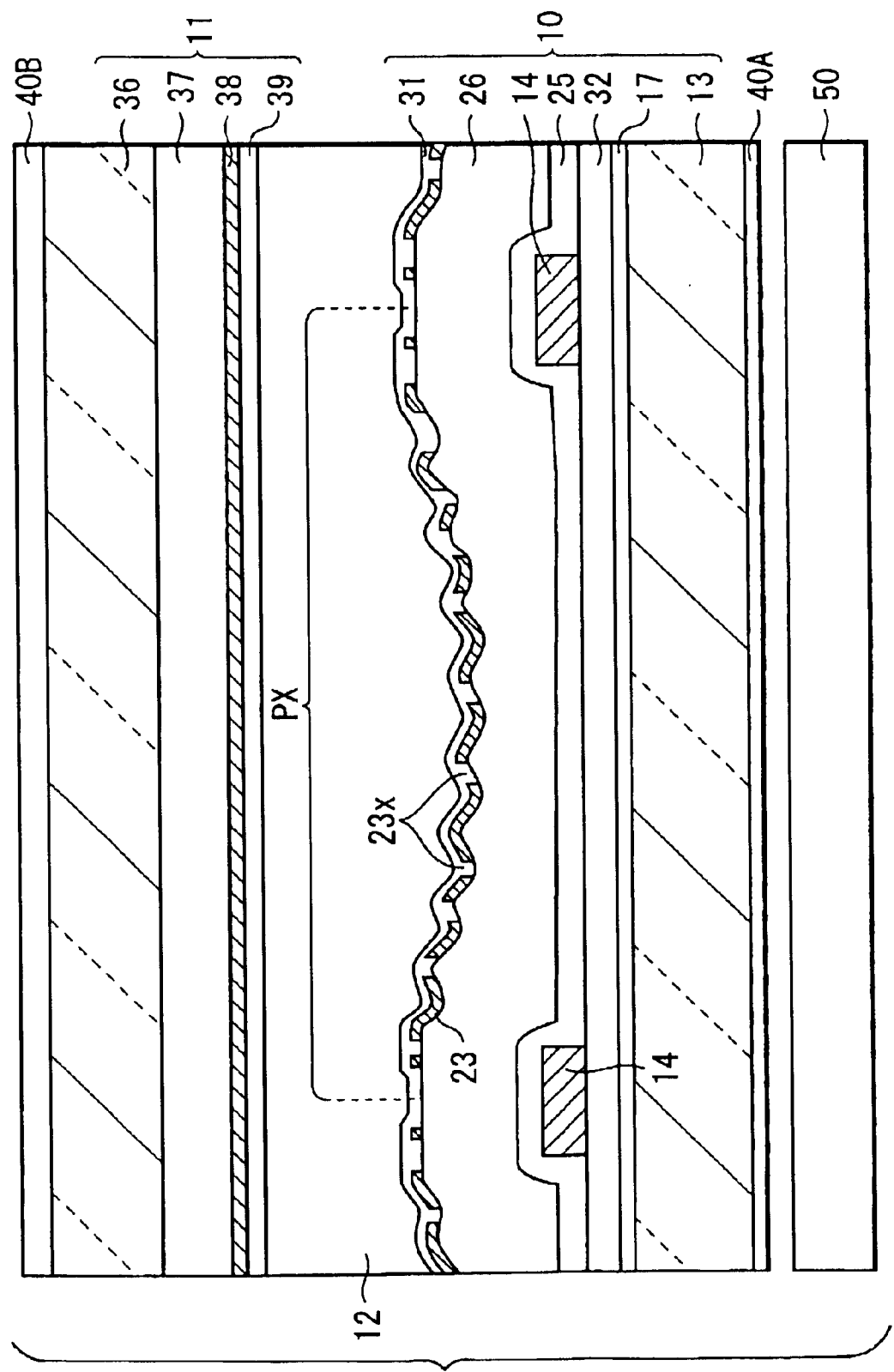
FIG. 18 is a sectional view schematically showing the construction of a semitransparent liquid crystal display unit according to another embodiment of the invention.

Although the reflection-type liquid crystal display unit has been described herein in connection with the foregoing embodiment, the present invention is not limited to this embodiment. The invention is also applicable to a liquid crystal display unit in which each pixel region PX is provided with a region having a reflecting function and a region having a light transmitting function, as shown in FIG. 18, for example. More specifically, the liquid crystal display unit arranged in this manner comprises a polarization plate 40A on the outer surface of an array substrate 10 and a polarization plate 40B on the outer surface of a counter substrate 11. Further, this liquid crystal display unit comprises a backlight unit 50 that is used to illuminate the back of the array substrate 10.

The reflective region is provided with the aforementioned reflective pixel electrode 23. Incident light transmitted through the polarization plate 40B and guided through the counter substrate 11 is modulated as it passes through a liquid crystal layer 12, and is reflected by the pixel electrode 23. This reflected light is modulated again as it passes through the liquid crystal layer 12, and is selectively transmitted through the polarization plate 40B. Thereupon, an image is displayed.

On the other hand, the light transmitting region is composed of openings 23X in the reflective pixel electrode 23. Light emitted from the backlight unit 50 is transmitted through the polarization plate 40A, then landed through the array substrate 10, and transmitted through the openings 23X. This transmitted light is modulated as it passes through the liquid crystal layer 12, and is selectively transmitted through the polarization plate 40B. Thereupon, an image is displayed.

According to the liquid crystal display unit with this construction, the same effect can be obtained by arranging the protuberances and recesses of the reflective pixel electrode 23 in the same manner as in the foregoing embodiment. Preferably, moreover, the openings 23X should be formed in flat portions of the pixel electrode 23, that is, in those portions which have tilt angles conducive to regular reflection. Thus, those parts of the pixel electrode 23 which are unnecessary for reflective display can be effectively utilized for transmissive display. In consequence, the reflecting properties of the reflector can be improved, and the transmissive display function can be enjoyed additionally.

Since the peak distance distribution of the adjacent protuberances is narrower than in the conventional case, the resulting reflector can enjoy an optimum tilt angle distribution if the maximum-distribution peak distances are adjusted to distances that ensure the optimum tilt angle distribution. Accordingly, components similar to regular reflection components that are not conducive to the brightness of display can be reduced. Thus, the resulting reflector is highly improved in brightness, uniformity, and display quality level.

According to the liquid crystal display unit constructed in this manner, as described herein, substantially ideal reflecting properties can be realized, and images with a satisfactory display quality level can be displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display unit comprising:
   a liquid crystal layer sandwiched between first and second substrates,
   the first substrate including a reflector for reflecting incident light guided through the second substrate and the liquid crystal layer,
   the reflector having a plurality of protuberances and recesses in each pixel region,
   the distances between the respective peaks of each two adjacent protuberances in the pixel region being distributed in the range from 5 $\mu$m to 15 $\mu$m, with the incidence of peak distances within the range of ±0.5 $\mu$m from the most frequent peak distance ranging from 40% to 80%,
   the area of regular reflection surfaces of the reflector tilted at angles of 4.5° or less to the principal surface of the first substrate in the pixel region accounting for 35% or less of the area of the pixel region.

2. A liquid crystal display unit according to claim 1, wherein said reflector includes a plurality of pixel electrodes formed of a reflective metallic material.

3. A liquid crystal display unit according to claim 1, wherein said first substrate has an insulating film as the ground of the reflector.

4. A liquid crystal display unit according to claim 3, wherein said insulating film includes an organic insulating film.

5. A liquid crystal display unit according to claim 4, wherein said organic insulating film is formed of a photosensitive resin.

6. A liquid crystal display unit according to claim 1, wherein said first substrate has a reflective region having a reflector scattering incident light guided through the second substrate and the liquid crystal layer and a light transmitting region transmitting incident light guided through the first substrate.

7. A liquid crystal display unit according to claim 1, wherein the average height from the bottom of the each recess to the peak of each protuberance thereof is 1.2 $\mu$m or less.

8. A liquid crystal display unit according to claim 7, wherein said average height of protuberances and recesses is 0.1 $\mu$m or more.

9. A liquid crystal display unit according to claim 1, wherein the peak distances between the protuberances in the peak distance distribution range from 7.5 $\mu$m to 12.5 $\mu$m.

10. A liquid crystal display unit comprising:
    a liquid crystal layer sandwiched between first and second substrates,
    the first substrate including a reflector for reflecting incident light guided through the second substrate and the liquid crystal layer,
    the reflector having a plurality of protuberances and recesses in each pixel region,
    the distances between the respective peaks of each two adjacent protuberances in the pixel region being distributed in the range from 5 $\mu$m to 15 $\mu$m, with the incidence of peak distances within the range of ±0.5 $\mu$m from the most frequent peak distance ranging from 40% to 80%,
    the average height from the bottom of the each recess to the peak of each protuberance thereof ranging from 0.1 $\mu$m to 1.2 $\mu$m.

* * * * *